(12) United States Patent
Nishimura et al.

(10) Patent No.: US 11,179,814 B2
(45) Date of Patent: Nov. 23, 2021

(54) CLAMPING MECHANISM, APPARATUS FOR MANUFACTURING JOINING MEMBER, AND METHOD FOR MANUFACTURING JOINING MEMBER

(71) Applicant: ORIGIN COMPANY, LIMITED, Saitama (JP)

(72) Inventors: Hironobu Nishimura, Saitama (JP); Shuichi Nozaki, Saitama (JP)

(73) Assignee: ORIGIN COMPANY, LIMITED, Saitama (JP)

( * ) Notice: Subject to any disclaimer, the term of this patent is extended or adjusted under 35 U.S.C. 154(b) by 0 days.

(21) Appl. No.: 17/280,156

(22) PCT Filed: Jan. 17, 2020

(86) PCT No.: PCT/JP2020/001551
§ 371 (c)(1),
(2) Date: Mar. 25, 2021

(87) PCT Pub. No.: WO2020/153263
PCT Pub. Date: Jul. 30, 2020

(65) Prior Publication Data
US 2021/0308810 A1    Oct. 7, 2021

(30) Foreign Application Priority Data
Jan. 22, 2019   (JP) .............................. JP2019-008540

(51) Int. Cl.
*B25B 11/00* (2006.01)
*B23K 37/053* (2006.01)
*B23K 101/40* (2006.01)
*B23K 11/14* (2006.01)
*B25B 11/02* (2006.01)

(52) U.S. Cl.
CPC ............ *B23K 37/053* (2013.01); *B23K 11/14* (2013.01); *B23K 2101/40* (2018.08); *B25B 11/02* (2013.01)

(58) Field of Classification Search
CPC ........... B25B 1/00; B25B 1/2452; B25B 6/00; B23Q 3/00; B23Q 3/06; B23Q 3/061
See application file for complete search history.

(56) References Cited

U.S. PATENT DOCUMENTS 5,556,085 A *   9/1996   Cyr ........................... B25B 1/22
                                                                269/156
6,612,589 B2 *   9/2003   Saito .................. B23B 31/16275
                                                                279/110

(Continued)

FOREIGN PATENT DOCUMENTS

CN         204430639 U       7/2015
JP         S 55-16765 B      5/1980

(Continued)

OTHER PUBLICATIONS

International Search Report dated Feb. 10, 2020 for International Patent Application No. PCT/JP2020/001551, English translation, 2 pages.

(Continued)

*Primary Examiner* — Lee D Wilson
(74) *Attorney, Agent, or Firm* — Squire Patton Boggs (US) LLP (57) ABSTRACT

To provide a clamping mechanism, and an apparatus and a method for manufacturing joined object, all of which allow, with a simple configuration, clamping of clamp objects having sizes different from each other, stably at their positions. A clamping mechanism 10 includes a plurality of clamp claws 11 configured to clamp an object S to be clamped; a plurality of support shafts 16 configured to pivotally support a corresponding clamp claw 11, wherein the corresponding clamp claw 11 pivots around the support shaft 16 for opening or closing movement; and a mover apparatus 12 configured to cause the clamp claw 11 to perform the opening or closing movement. A joined object (Continued)

manufacturing apparatus includes the clamping mechanism 10, a holder configured to hold an object to be joined, and a joining apparatus configured to join the object S clamped by the clamping mechanism 10 and the object to be joined that is held by the holder. A method for manufacturing a joined object includes causing the clamping mechanism 10 to clamp the object S by use of the joined object manufacturing apparatus, causing the holder to hold the object to be joined, and joining the both.

7 Claims, 5 Drawing Sheets

(56) References Cited

U.S. PATENT DOCUMENTS

| | | | | |
|---|---|---|---|---|
| 6,932,558 | B2* | 8/2005 | Wu | H01L 21/68728 414/757 |
| 8,991,888 | B2* | 3/2015 | Schlaich | B25J 15/08 294/213 |
| 2003/0219333 | A1* | 11/2003 | Takeuchi | H01L 21/68728 414/744.6 |

FOREIGN PATENT DOCUMENTS

| | | |
|---|---|---|
| JP | H 09-47908 A | 2/1997 |
| JP | H 11-188553 A | 7/1999 |
| JP | H 11-309651 A | 11/1999 |
| JP | 2001-341041 A | 12/2001 |
| JP | 2018-167308 A | 11/2018 |

OTHER PUBLICATIONS

Notice of Reasons for Refusal dated Aug. 6, 2019 for Japanese Patent Application No. 2019-008540, with English translation, 10 pages.

Notice of Reasons for Refusal dated Nov. 19, 2019 for Japanese Patent Application No. 2019-008540, with English translation, 12 pages.

Notice of Reasons for Refusal dated Jan. 29, 2020 for Japanese Patent Application No. 2019-008540, with English translation, 7 pages.

* cited by examiner

CLAMPING MECHANISM, APPARATUS FOR MANUFACTURING JOINING MEMBER, AND METHOD FOR MANUFACTURING JOINING MEMBER

CROSS-REFERENCE

This application is a National Stage filing under 35 U.S.C. § 371 of International Patent Application No. PCT/JP2020/001551, filed Jan. 17, 2020, which claims the benefit and priority to JP Application No. 2019-008540, filed Jan. 22, 2019, both applications which are incorporated herein by reference in their entirety for all purposes.

TECHNICAL FIELD

The present invention relates to clamping mechanisms, joined object manufacturing apparatuses, and method for manufacturing joined object, particularly to a clamping mechanism, a joined object manufacturing apparatus, a method for manufacturing joined object, all of which allow clamping of objects having different sizes, stably at their center positions.

BACKGROUND ART

An optical semiconductor is configured by attaching a cap having a lens to a stem having a photoelectric conversion element and other elements mounted thereon such that the cap can cover those elements. Among apparatuses for welding a cap to a stem is an apparatus in which a stem is clamped by a holder of a lower electrode, a cap is clamped by a balloon chuck of an upper electrode, the upper electrode is moved in the vertical direction, and resistance welding is then performed. In this welding apparatus, the holder of the lower electrode is a two-parts holder that is divided in two parts, i.e., a reference part and a pressing part. When the two parts approach each other, the stem can be clamped and when the two parts separate each other, the stem can be unclamped. In this case, in order to increase the clamping-unclamping speed of the stem, clamping of the stem is carried out in such a manner that the reference part is firstly fixed at a clamping position and then the pressing part is moved toward the reference part to clamp the stem (for example, see Patent Document 1).

RELATED ART DOCUMENT

Patent Document

[Patent Document 1] JP 2018-167308 A (paragraph [0026], FIG. 4, etc.)

SUMMARY OF THE INVENTION

Problem to be Solved by the Invention

With the two-parts holder of the welding apparatus described in Patent Document 1, one side (reference part) of the holder is used as a reference in clamping the stem. In the case of the stems with variations in their outer diameters, there is a possibility that the center position of the stem also varies when positioning of the stem is performed before joining with the cap. For this reason, with the welding apparatus described in Patent Document 1, the contour of the stem is grasped by photographing it with a camera in advance of the clamping, then the stem is clamped with the holder, followed by moving the lower electrode, which holds the stem, such that the stem is appropriately in place in accordance with the grasped contour.

In view of the problems described above, an object of the present invention is to provide a clamping mechanism, a joined object manufacturing apparatus, a method for manufacturing joined object, all of which allow, with a simple configuration, clamping of objects having sizes different from each other, stably at their positions.

Means for Solving the Problem

Figure 1:
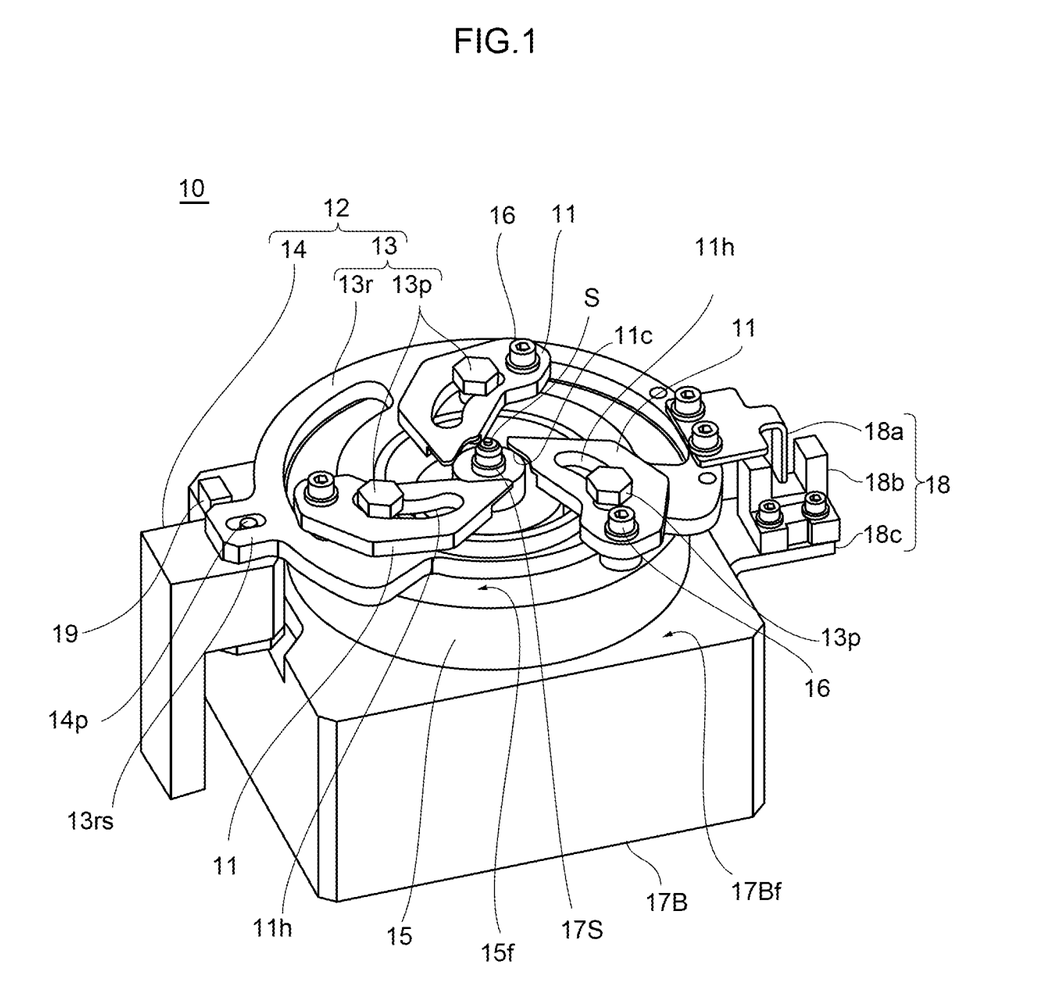
FIG. 1 is a perspective view illustrating a schematic configuration of a clamp unit according to a first embodiment of the present invention.

To achieve the above object, a clamping mechanism according to the first aspect of the present invention includes, as shown in FIG. 1, for example, a plurality of clamp claws 11, each clamp claw 11 including a contact portion 11c configured to contact an object S to be clamped, wherein the plurality of clamp claws 11 clamps the object S by contacting each contact portion 11c with the object S; a plurality of support shafts 16, each support shaft 16 pivotally supporting a corresponding clamp claw 11 at a position away from the contact portion 11c of the corresponding clamp claw 11, wherein the corresponding clamp claw 11 pivots around the support shaft 16 to cause the contact portion 11c to approach and go away from the object S for opening or closing movement of the corresponding clamp claw 11; and a mover apparatus 12 configured to cause each clamp claw 11 to perform the opening or closing movement.

With this configuration, each of the plural clamp claws pivots on the corresponding support shaft to clamp the object, which allows a simple configuration for stably clamping different objects of different sizes at their center positions.

As for a clamping mechanism according to the second aspect of the present invention, as shown in FIG. 1, for example, in the clamping mechanism 10 according to the first aspect, in a case in which the clamp claws 11 sequentially clamp the object S, the mover apparatus 12 is configured to cause the clamp claws 11 to perform the opening or closing movement such that a maximum clearance between the contact portion 11c of each clamp claw 11 and the object S is a first predetermined distance; and in a case in which the clamp claws 11 do not clamp the object S, the mover apparatus 12 is configured to allow a clearance between the contact portion 11c of each clamp claw 11 and the object S to be widened to be a second predetermined distance larger than the first predetermined distance.

With this configuration, in a case in which the objects are sequentially clamped, the maximum clearance can be set relatively small to shorten the time required for each clamp claws to open and close, resulting in increase of productivity. In a case in which maintenance or the like is carried out, the claws' opening can be made larger to improve an ease of maintenance.

As for a clamping mechanism according to the third aspect of the present invention, as shown in FIG. 1, for example, the clamping mechanism 10 according to the first or second aspect, further includes a base 15 configured to support each support shaft 16 such that each support shaft 16 protrudes from a surface 15f of the base 15, wherein the mover apparatus 12 includes: a swivel ring 13 including rod-shaped members 13p inserted through an elongated hole 11h formed in the clamp claw 11; and an actuator 14 configured to rotate the swivel ring 13, relative to the base 15, along the surface 15f of the base 15, wherein each rod-shaped member 13p is configured to move relative to the elongated hole 11h in a longitudinal direction of the elongated hole 11h to cause the corresponding clamp claw 11 to perform the opening or closing movement.

With this configuration, a relatively simple configuration allows the clamp claws to perform their opening or closing movement.

As for a clamping mechanism according to the fourth aspect of the present invention, as shown in FIG. 1, for example, in the clamping mechanism 10 according to the third aspect, the mover apparatus 12 is configured such that the actuator 14 and the swivel ring 13 are detachably connected to each other and such that, in a case in which the swivel ring 13 is attached to the actuator 14, the actuator 14 is configured to cause the swivel ring 13 to rotate by a predetermined stroke; and the predetermined stroke enables the mover apparatus 12 to provide the clamp claws 11 with sufficient opening or closing movement to clamp the object S sequentially.

This configuration makes it possible to achieve both improvement of productivity and the ease of maintenance, while simplifying the configuration of the mover apparatus.

As for a clamping mechanism according to the fifth aspect of the present invention, as shown in FIG. 1, for example, the clamping mechanism 10 according to any one of the first aspect to fourth aspect, further includes a stopper 19 configured to directly and indirectly restrict the clamp claws 11 from approaching each other more than a third predetermined distance.

This configuration makes it possible to prevent an excessive force from being applied to the object.

Figure 3:
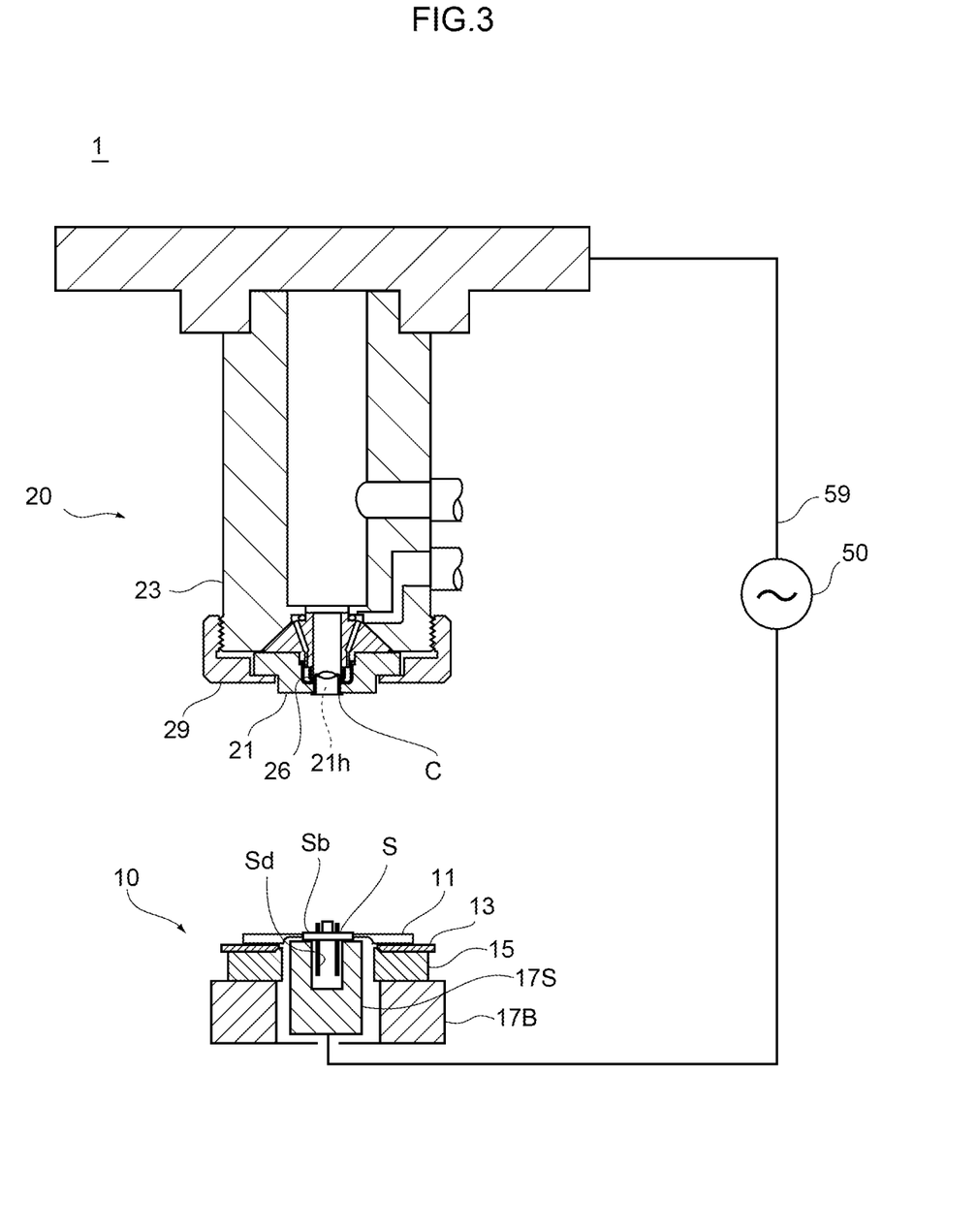
FIG. 3 is a cross-sectional elevational view illustrating a schematic configuration of a welding apparatus according to a second embodiment of the present invention.

Further, a joined object manufacturing apparatus according to the sixth aspect of the present invention includes, as shown in FIG. 3, for example, the clamping mechanism 10 according to any one of the first aspect to the fifth aspect; a holder 20 configured to hold an object C to be joined to the object S; and a joining apparatus 17S, 20 and 50 configured to join a portion where the object S, clamped by the clamping mechanism 10, contacts the object C to be joined that is held by the holder 20.

With this configuration, as the clamping mechanism is provided, it makes possible to manufacture high accurately joined object.

Figure 4A:
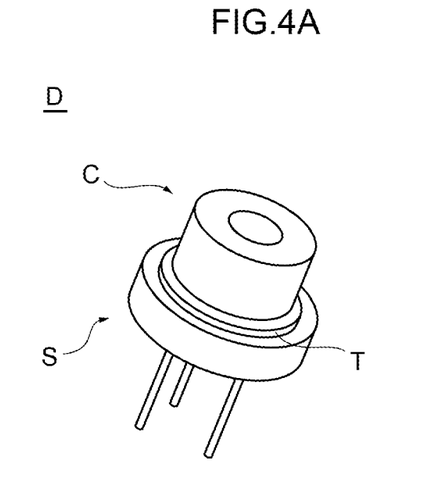
FIG. 4A is a perspective view of an example of a joined object and FIG. 4B is a disassembled, partially cross-sectional, side-elevational view of an example of the joined object.
Figure 5:
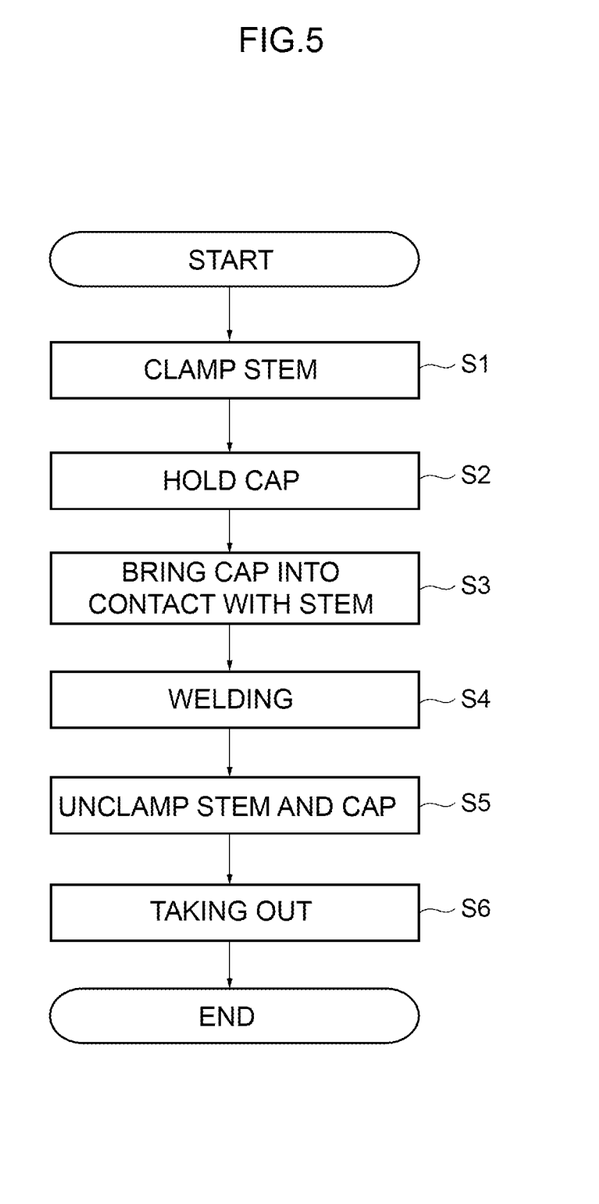
FIG. 5 is a flowchart illustrating a procedure for manufacturing a device.

As for a method for manufacturing a joined object according to the seventh aspect of the present invention, as shown in FIGS. 1, 3 and 5 for example, the method is a method for manufacturing a joined object D (refer to FIG. 4A, for example) by use of the joined object manufacturing apparatus 1 according to the sixth aspect, and the method includes causing the clamping mechanism 10 to clamp the object S (S1); causing the holder 20 to hold the object C to be joined (S2); and joining the object S, clamped by the clamping mechanism 10, with the object C to be joined that is held by the holder 20.

This configuration makes it possible to manufacture high accurately joined object.

Advantage of the Invention

According to the present invention, each of the plural clamp claws pivots on the corresponding support shaft to clamp the object, which allows a simple configuration for stably clamping different objects of different sizes at their center positions.

DESCRIPTION OF EMBODIMENTS

This application is based on the Patent Application No. 2019-008540 filed on Jan. 22, 2019 in Japan, the contents of which are hereby incorporated in its entirety by reference into the present application, as part thereof.

The present invention will become more fully understood from the detailed description given hereinbelow. Further range of application of the present invention will become clearer from the detailed description given hereinbelow. However, the detailed description and the specific embodiment are illustrated of desired embodiments of the present invention and are described only for the purpose of explanation. Various changes and modifications will be apparent to those ordinary skilled in the art on the basis of the detailed description.

The applicant has no intention to give to public any disclosed embodiment. Among the disclosed changes and modifications, those which may not literally fall within the scope of the patent claims constitute, therefore, a part of the present invention in the sense of doctrine of equivalents.

Description will hereinafter be made of an embodiment of the present invention with reference to the drawings. The same or corresponding members are denoted with the same reference numerals in all the drawings, and their descriptions are not repeated.

Figure 2:
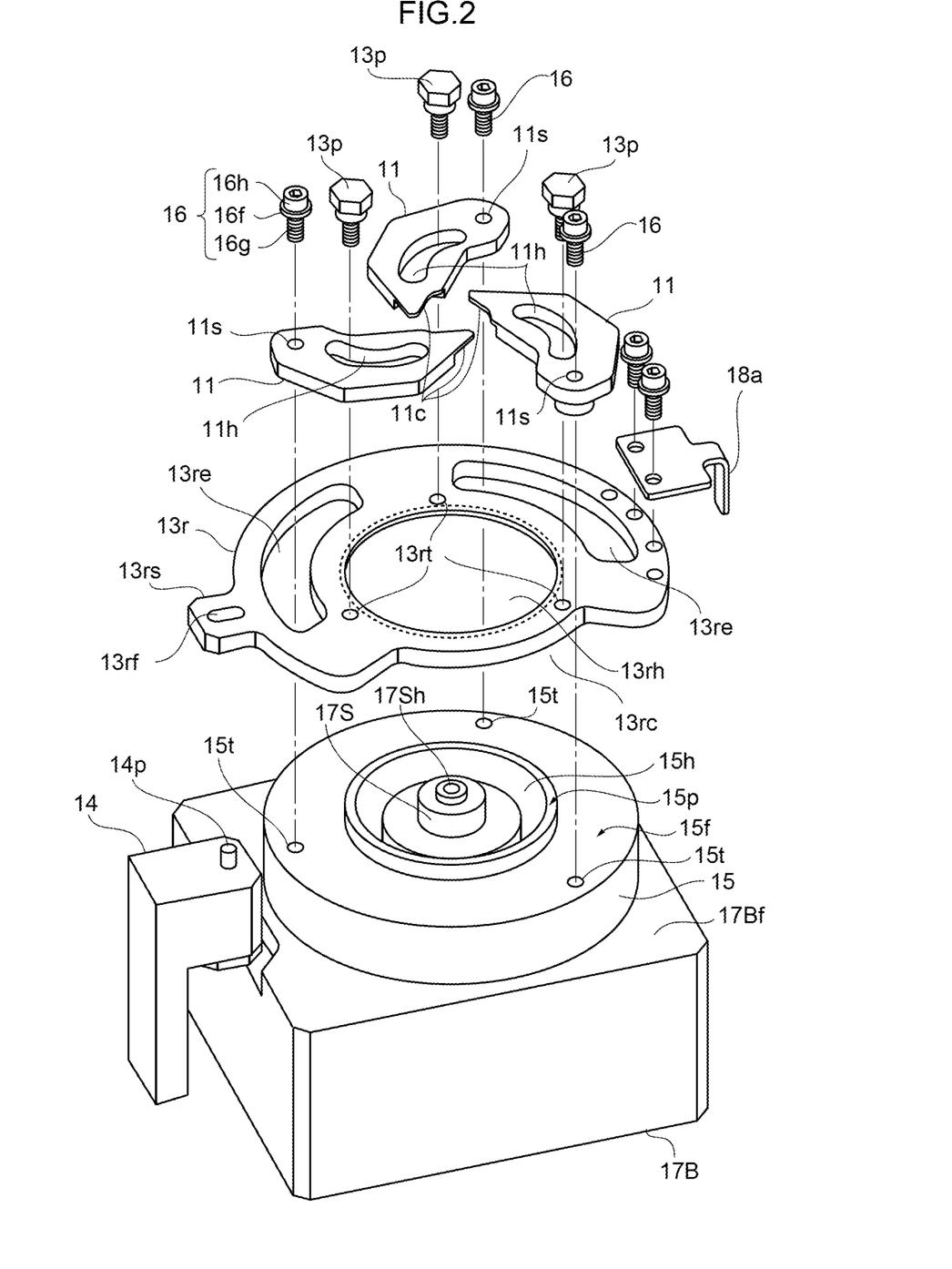
FIG. 2 is an exploded perspective view of the clamp unit according to a first embodiment of the present invention.

First, referring to FIGS. 1 and 2, a clamp unit 10 serving as a clamping mechanism according to a first embodiment of the present invention will be described. FIG. 1 is a perspective view illustrating a schematic configuration of the clamp unit 10. FIG. 2 is an exploded perspective view of the clamp unit 10. The clamp unit 10 is typically one of the components constituting a welding apparatus 1, shown in FIG. 3, serving as a joined object manufacturing apparatus according to a second embodiment of the present invention. In the present embodiment, the welding apparatus 1 is one for welding a cap C to a stem S. Here, a joined object to be manufactured by welding the cap C to the stem S will be described prior to the description of the clamp unit 10 and the welding apparatus 1.

Figure 4B:
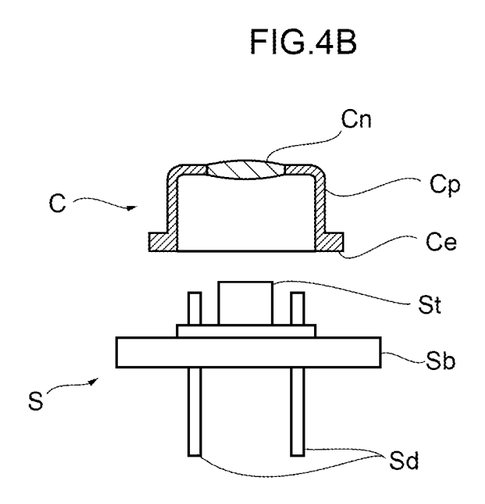

FIG. 4A is a perspective view of a device D serving as a joined object and FIG. 4B is a disassembled, partially cross-sectional, side-elevational view of the device D. The device D in the present embodiment will be described as an optical semiconductor. The device D is configured by joining the cap C to the stem S. FIG. 4B illustrates a state in which the cap C and stem S are separate from each other before assembly of the device D, with the cap C and stem S being depicted in the cross-sectional and side-elevational views, respectively. The stem S has a base Sb on which a transistor, electrodes, etc. (hereinafter, referred to as "mounted section St") are mounted for forming a photo-electric conversion element, and leads Sd extend from the base Sb. In the present embodiment the base Sb is formed in a disk shape. The leads Sd extend from the base Sb to the opposite side from the mounted section St. The base Sb and leads Sd are formed of metal. The cap C is configured to be attached to the base Sb to cover the mounted section St of the stem S. The cap C has a generally cylindrical appearance, and can accommodate the mounted section St therein. The cap C has an outer peripheral portion Cp corresponding to a side surface of the cylinder, of which one end is opened and the other end is closed. In the present embodiment, the diameter of the outer peripheral portion Cp in the cross section perpendicular to an axis of the cylinder is approximately 5 mm. The cap C is provided with a lens Cn on the top face, i.e., the end surface on the closed end side, for permeating laser light therethrough. The cap C is configured such that an edge Ce on the opened end side is extended slightly outward to provide a face reliable for receiving a pressure applied during welding. The outer periphery of the edge Ce, according to the present embodiment, is formed in a circle shape having a size equal to or less than the outer periphery of the base Sb. The cap C, except the portion of the lens Cn, is formed of metal. Metal portions of the stem S and cap C are formed of a metal typically such as stainless steel and Kovar; however, they may be formed of a metal other than these metals. The metal portions of the stem S and cap C are typically formed of dissimilar metals; however, they may be formed of the same type of metal. The device D is configured by covering the mounted part St with the cap C, followed by welding the edge Ce to the base Sb. In the present embodiment, the stem S corresponds to the object to be clamped and the cap C corresponds to the object to be joined.

Referring again to FIGS. 1 and 2, the configuration of the clamp unit 10 will be described. The clamp unit 10 includes: a plurality of clamp claws 11, a mover apparatus 12 for each clamp claw 11 to perform an opening or closing movement, a base 15, pins 16 for supporting each clamp claw 11 pivotally with respect to the base 15, and a stopper 19 for restricting the opening or closing movement of the clamp claws 11.

The clamp claws 11 are intended to clamp (grip) the stem S, through collaboration of the plural clamp claws. Each of the clamp claws 11, in the present embodiment, is formed by processing a plate-shaped material into a shape as described below. The clamp claw 11 has a planar shape that is formed in an arc as a whole and a slightly elongated shape. The term "arc as a whole" means that the shape is not strictly a circular arc shape but a generally arc shape when generally viewed after the claw has been subjected to chamfering or any other process. The planar shape of the clamp claw 11 in this case has a maximum length that is approximately 1.8 to 2.0 times the length in the direction orthogonal to the direction of the maximum length. In the clamp claw 11, a contact portion 11c is formed at one end of the claw in the longitudinal direction and a support hole 11s (see FIG. 2) is formed at the other end. The contact portion 11c is a portion including a side surface that comes in contact with the stem S when clamping the stem S. Typically, the contact portion 11c is configured to clamp the side surface of the base Sb (see FIG. 4B) formed in a disk shape. Since the stem S is a relatively small component, the contact portion 11c is formed to be relatively thin (here, approximately 0.5 to 1.0 mm) so as not to hamper the cap C (see FIGS. 4A and 4B) when joining the cap C to the stem S. From a standpoint of enhancing stiffness, the clamp claw 11 except the contact portion 11c is formed to have a thickness larger than that of the contact portion 11c (for example, the thickness 2.5 to 3.0 times larger than that of the contact portion 11c). When the contact portion 11c clamps the stem S, the surface of the contact portion 11c (side surface of the contact portion 11c) which comes in contact with the stem S is preferably formed in an arc shape (typically, circular arc shape). From the standpoint of making the clamping stable regardless of the size of the stem S, the surface, to be in contact with the stem S, of the contact portion 11c has the following curvature when assuming that the surface's contour is of a circular arc in a plan view. That is, the curvature is preferably made equal to the minimum curvature (the reciprocal of the radius of the circle) of expected circle shapes that the stems S will have. The boundary between the contact portion 11c of the clamp claw 11 and other portions except the contact portion 11c (the boundary between the thin portion and the thick portion) is preferably formed to have a circular arc shape that has a common center with the circular arc shape of the contact portion 11c's surface that is to be in contact with the stem S. From the standpoint of suppressing a reduction in stiffness of the clamp claw 11, the lower surface of the contact portion 11c (the surface expanding to the boundary between the thin and thick portions of the clamp claw 11) is preferably made as small as possible within a region that does not interfere with the clamping of the stem S. The upper surface of the clamp claw 11 is preferably formed such that the contact portion 11c is flush with the other portion. The support hole 11s is a hole through which the pin 16 is inserted. The support hole 11s is formed at a position away from the contact portion 11c. The support hole 11s penetrates in the direction of thickness of the clamp claw 11. From the standpoint of increasing its section modulus for reinforcement, the clamp claw 11 at the surrounding portion of the support hole 11s may be formed to be thick relative to other peripheral portions that are further away from the hole than the surrounding portion of the support hole 11s.

In addition, in the clamp claw 11, an elongated hole 11h is formed between the contact portion 11c and the support hole 11s. The elongated hole 11h penetrates the clamp claw 11 in the direction of the thickness. Moreover, the elongated hole 11h is formed in a circular arc shape, in a plan view, elongated in the longitudinal direction of the clamp claw 11. The elongated hole 11h is curved in the same direction as the circular arc shape, as a whole, of the clamp claw 11 itself. The clamp claws 11 configured in this way are preferably disposed such that the odd number of the clamp claws 11 are typically arranged at equal angles (equal intervals) at the circumference of the stem S when the stem S to be clamped is placed at a predetermined position (lower electrode 17S). Setting the number of the clamp claws 11 to be an odd number, allows a decrease in variations of the center position of the stem S, with such variations occurring each time of clamping of the stem S for positioning. Moreover, the arrangement of the three clamp claws 11 allows stable positioning of the center position of the stem S when being clamped, with a simple configuration while ensuring the length of the elongated hole 11h in the longitudinal direction.

The mover apparatus 12 is intended to cause the clamp claws 11, i.e., a plurality of the clamp claws 11 being disposed, to perform opening or closing movement. The opening or closing movement referred to here is a reciprocating motion in which, with respect to the stem S placed at a predetermined position (a clamping position which is typically at the lower electrode 17S), the contact portion 11c of each of the clamp claws 11 approaches and goes away from the stem. Note that the state in which each clamp claw 11 clamps the stem S (i.e., the clamp claw 11 is in contact with the stem S) is referred to as "closed," while the state in which each clamp claw 11 is not in contact with the stem S is referred to as "opened." The mover apparatus 12 includes a swivel ring 13 and an actuator 14. The swivel ring 13 includes, in addition, a ring body 13r and a bolt 13p.

The ring body 13r, in the present embodiment, is formed by processing a basically-disk-shaped material (for example, with a thickness of approximately 3 mm) in the following manner. The ring body 13r is provided with a middle hole 13rh (see FIG. 2) formed in the center. The middle hole 13rh is circular and is formed to a size that allows the lower electrode 17S in contact with the stem S to be taken in and out, and is formed to have a diameter of typically approximately 0.5 times the outer diameter of the ring body 13r. On the outside of the middle hole 13rh, two outer peripheral holes 13re and one cut-out portion 13rc are formed. The two outer peripheral holes 13re and the cut-out portion 13rc are formed such that, assuming that the ring body 13r is equally divided into three parts in the circumferential direction, the two outer peripheral holes 13re are formed at the positions of two parts of the divided three parts, on a one hole per each position basis, and the cut-out portion 13rc is formed at the position of the remaining one part. Each of the outer peripheral holes 13re is formed to be slenderly elongated along the circumference of the ring body 13r. The cut-out portion 13rc is formed by recessing the outer circumference of the ring body 13r. The innermost contour (the portion closest to the center of the ring body 13r) of both the cut-out portion 13rc and each outer peripheral hole 13re are located on the same virtual circumference. There remain portions in which no space (cavity) is formed, between the outer peripheral holes 13re and between each outer peripheral hole 13re and the cut-out portion 13rc. Between the middle hole 13rh and the virtual circumference which defines the innermost contours of the cut-out portion and each of the outer peripheral holes 13re, a screw holes 13rt to which bolts 13p are to be fastened are formed. The screw holes 13rt, the number of which equals the number (three in the present embodiment) of the clamp claws 11, are formed by tapping at equal intervals in the circumferential direction. The ring body 13r is formed such that the thickness is thin (for example, approximately 1 mm) at a portion (the portion surrounded by the dotted line in FIG. 2) which is located inner than each screw hole 13rt and at the circumference of the middle hole 13rh, with the thin portion being thinned from one side (hereinafter, referred to as "back surface"). In other words, a step is formed at the surrounding portion of the middle hole 13rh on the back surface of the ring body 13r. A protruding portion 13rs protruding outward is disposed at one location on the outer circumference of the ring body 13r. The protruding portion 13rs serves as a portion that fits with the actuator 14. In the protruding portion 13rs, a fitting hole 13rf is formed into which a protrusion 14p of the actuator 14 is fitted. The fitting hole 13rf is formed to be elongated in a radial direction of the ring body 13r.

The bolt 13p correspond to a rod-shaped member for regulating the movement of the clamp claw 11 when the bolt 13p is inserted into the elongated hole 11h of the clamp claw 11. The relationship between the diameter of a portion of the bolt 13p to be inserted into the clamp claw 11 and the width of the elongated hole 11h of the clamp claw 11 is as follows: The bolt 13p has a size in which, when moving in the longitudinal direction of the elongated hole 11h, the bolt can smoothly move with smallest possible play. The bolt 13p typically includes a metal collar (not shown) that surrounds the outer periphery of the screw thread of the portion of the bolt 13p to be inserted into the elongated hole 11h, and the metal collar (not shown) is disposed in a state of being not fixed (movably) to the periphery of the screw thread and the clamp claw 11. This allows smooth moving of the bolt 13p along the longitudinal direction of the elongated hole 11h. The bolt 13p passes through the elongated hole 11h of the clamp claw 11 and then screwed into the screw hole 13rt of the ring body 13r, thereby being fixed to the ring body 13r.

The actuator 14 functions rotate the swivel ring 13 in the circumferential direction of the ring. The actuator 14 is formed in a generally rectangular parallelepiped shape, in the present embodiment, and is provided with a protrusion 14p on the top surface of the actuator 14. The actuator 14 is disposed at a position where the protrusion 14p can fit into the fitting hole 13rf of the swivel ring 13. The protrusion 14p of the actuator 14 is configured to be thrust into the inside of the rectangular parallelepiped shape, and configured to allow the swivel ring 13 to be attached and detached. The actuator 14 is configured to perform a reciprocating linear movement in the tangential direction of a circumference of the ring body 13r at a position of the protruding portion 13rs. During the reciprocating linear movement of the actuator 14, the swivel ring 13 is rotated in the circumferential direction of the ring body 13r within the range in which the protrusion 14p can move inside the fitting hole 13rf. Here, the term "rotate" means to move along the circumference in both forward and reverse directions, and is sometimes called "pivot." Since the actuator 14 can perform the reciprocating linear movement only within the range in which the protrusion 14p can move inside the fitting hole 13rf, the distance of the actuator's movement is relatively small. In this way, the actuator 14 has such a relatively simple mechanism that it can be constituted at a low cost. Moreover, the distance of rotation of the swivel ring 13 within the range in which the protrusion 14p can move inside the fitting hole 13rf, corresponds to a predetermined stroke. The actuator 14 is typically configured such that its operation is controlled by a controller (not shown).

The base 15 is one on which the swivel ring 13 is mounted and to which each clamp claw 11 is attached. The base 15 is generally columnar (solid cylindrical) and formed, in the present embodiment, such that the outer diameter of the base is larger than the contour of the outermost portion (the portion farthest from the center of the ring body 13r) of the peripheral hole 13re of the ring body 13r, and is smaller than the outer diameter of the ring body 13r. The base 15 is provided with a center hole 15h formed at the center portion of a portion of the base that corresponds to one end surface of the generally columnar base. The center hole 15h is circular and formed to a size that allows the lower electrode 17S in contact with the stem S to be taken in and out, and is formed to have a diameter typically one size smaller than the diameter of the middle hole 13rh of the ring body 13r. As to the surface of the base 15 on the side on which the center hole 15h is formed, most part of the surface outside the center hole 15h includes a surface 15f that is formed to be flat. The innermost portion of the surface 15f surrounding the center hole 15h is a raised portion 15p that is one step higher than the surface 15f. In order that the step (thinned portion) formed at the surrounding portion of the middle hole 13rh on the back surface of the ring body 13r can be fitted onto the raised portion 15p, the outer diameter of the raised portion 15p is slightly smaller than the diameter of the step. In the surface 15f of the base 15, pin holes 15t are formed into which the pins 16 are to be fitted. The pin holes 15t, the number of which equals the number (three in the present embodiment) of the clamp claws 11, are formed at equal intervals in the circumferential direction. Moreover, the pin holes 15t are formed to be located on a virtual circumference that is assumed to equally divide, into two, the width of each of the outer peripheral holes 13*re* when the ring body 13*r* is mounted on the base 15 so that the step portion of the ring body 13*r* can be fitted onto the raised portion 15*p*.

The base 15 is mounted, in the present embodiment, on a pedestal 17B. The pedestal 17B is formed in a generally rectangular parallelepiped shape. In the pedestal 17B, a mounting surface 17Bf on which the base 15 is mounted is formed in a square shape one side of which is larger than the diameter of the base 15. In the pedestal 17B, a cavity (not shown) is formed at the central portion of the mounting surface 17Bf to extend perpendicularly to the mounting surface 17Bf. The cavity (not shown) of the pedestal 17B is formed in a cylindrical shape with a diameter slightly larger than that of the center hole 15*h* of the base 15. Inside of the cavity (not shown) of the pedestal 17B, a lower electrode 17S on which the stem S is to be placed is disposed. The lower electrode 17S is formed in a columnar shape and made of a metal material to conduct electric current, and is disposed inside of the cavity (not shown) of the pedestal 17B in the direction such that the axis of the columnar electrode coincides with the axis of the base 15. In the lower electrode 17S, the one end surface of the columnar electrode is the surface on which the stem S is to be placed. The one end surface can be seen at a position close to the raised portion 15*p* of the base 15. In the central portion of the surface of the lower electrode 17S on which the stem S is to be placed, an insertion hole 17Sh is formed for accommodating the leads Sd (see FIGS. 4A and 4B) of the stem S. The diameter of the insertion hole 17Sh of the lower electrode 17S is smaller than that of the base Sb (see FIG. 4B) of the stem S but can accommodate all the leads Sd.

Each of the pins 16 is a member for supporting the corresponding clamp claw 11 to be able to perform the opening or closing movement with respect to the base 15 as described above, and the pin 16 corresponds to a support shaft. The pin 16 includes a round rod-shaped fitting portion 16*g*, a flange portion 16*f* disposed at one end of the fitting portion 16*g*, and a head portion 16*h* disposed on the opposite side of the flange portion 16*f* from the fitting portion 16*g*. The fitting portion 16*g* is formed to pass through the support hole 11*s* of the clamp claw 11 and also to fit into the pin hole 15*t* of the base 15. To the fitting portion 16*g*, a metal collar (not shown) is typically attached before the fitting portion is inserted into the support hole 11*s*. The flange portion 16*f* is formed in a thin disk shape having an outer diameter larger than that of the support hole 11*s* of the clamp claw 11 but does not protrude outside of the clamp claw 11. The head portion 16*h* is formed typically in a cylindrical shape having an outer diameter smaller than that of the flange portion 16*f*; however, it may be formed in a cylindrical shape having the same outer diameter as the flange portion 16*f*, i.e., formed integrally with the flange portion 16*f* without any difference and boundary therebetween. The number of the pins 16 is equal to the number of the clamp claws 11, thereby the base 15 being capable of supporting a plurality of the respective clamp claws 11.

All the above-described parts constituting the clamp unit 10 are typically assembled by the following procedure, but the order of assembly is not limited to that shown below. Typically, first, the base 15 is mounted on the mounting surface 17Bf of the pedestal 17B with the surface 15*f* facing upward. The ring body 13*r* is mounted on the base 15 such that the thin portion around the middle hole 13*rh* of the ring body 13*r* fits onto the raised portion 15*p*. For each clamp claw 11, the curve direction of the elongated hole 11*h* is aligned with the curve direction of the outer peripheral hole 13*re*, and the direction (rotational direction) on a virtual circumference when viewing the contact portion 11*c* from the support hole 11*s* is aligned. Then the clamp claws 11 are mounted on the ring body 13*r*. The fitting portion 16*g* of each pin 16 passes through the support hole 11*s* and either the outer peripheral hole 13*re* or the cut-out portion 13*rc*, in this order, and then is inserted into the pin hole 15*t*. At this time, the fitting portion 16*g* is preferably provided with the metal collar (not shown), before passing through the support hole 11*s*. Moreover, the fitting portion 16*g* is preferably inserted into the pin hole 15*t* such that the flange portion 16*f* can lightly touch the clamp claw 11. Further, the bolt 13*p* passes through the elongated hole 11*h*, and then is screwed into the screw hole 13*rt*. When the base 15 on which these parts are attached in this way is mounted on the mounting surface 17Bf of the pedestal 17B, the protruding portion 13*rs* of the ring body 13*r* is set to come close to one side surface of the rectangular parallelepiped of the pedestal 17B. The actuator 14 is attached along the one side surface, to which the protruding portion 13*rs* comes close, of the pedestal 17B, and then the protrusion 14*p* is fitted into the fitting hole 13*rf*. The clamp unit 10 is configured to operate as follows: The actuator 14 performs a small reciprocating linear movement along the one side surface of the pedestal 17B, which causes the ring body 13*r* fitted into the protrusion 14*p* to rotate along the surface 15*f* of the base 15. Accompanying this rotation, each of the bolts 13*p* performs a reciprocating movement in the elongated hole 11*h* to cause the corresponding clamp claw 11 to pivot around the pin 16, resulting in an opening or closing movement of the clamp claw 11.

The stopper 19 (see FIG. 1) is a member for preventing excessive rotation of the ring body 13*r* in order to regulate the movement of the clamp claw 11 in the closing direction. In FIG. 1, a counterclockwise movement of the ring body 13*r* causes the bolt 13*p* to move inside the elongated hole 11*h* from the support hole 11*s* side to the contact portion 11*c* side, thereby causing the clamp claw 11 to move toward the opening direction. A clockwise movement of the ring body 13*r* causes the bolt 13*p* to move inside the elongated hole 11*h* from the contact portion 11*c* side to the support hole 11*s* side, thereby causing the clamp claw 11 to move toward the closing direction. When clamping the stem S, an excessive movement of the clamp claw 11 in the closing direction possibly causes an excessive external force acting on the stem S, resulting in possible damage to the stem S. In the present embodiment, the stopper 19 is disposed downstream of the protruding portion 13*rs*, when viewed clockwise, to prevent the ring body 13*r* from moving downstream beyond the stopper 19. The position at which the stopper 19 is disposed is set to be a position that can restrict all the clamp claws 11 from approaching each other beyond a predetermined distance between them. The predetermined distance here is a distance at which the stem S can be gripped with all the clamp claws 11 without damage on the stem S, and corresponds to a third predetermined distance. Note that, in the case where the object to be clamped (corresponding to the stem S in the present embodiment) is something prone to deform or the like and where it is desired to adjust the clamping for avoiding the object to be clamped (hereinafter, it may be called "clamping object") from receiving any force by the clamp claws 11, the third predetermined distance may be a "sun-dome" (stopping just before) distance in which the clamp claws 11 come into contact with the clamping object but exert no external force on the object. Such a "sun-dome" case is also included in a mode in which the clamping object is clamped by all the clamp claws 11, because the "sun-dome" is performed in the same manner as when the clamping object is gripped by each clamp claw 11 in that the positioning of the clamping object is performed by all the clamp claws 11.

In addition to the above configuration, the clamp unit 10 includes a sensor portion 18. The sensor portion 18 is intended to detect that the clamp claws 11 are at positions at which they can clamp the stem S. The sensor portion 18 includes a detection piece 18a, sensor 18b, and cradle 18c. Note that, for convenience of explanation, the sensor 18b and the cradle 18c are removed in FIG. 2. The detection piece 18a is attached at the outer circumference of the ring body 13r on the opposite side of the center from the protruding portion 13rs. The sensor 18b includes two small blocks for sandwiching the detection piece 18a therebetween, thereby functioning as follows. When the detection piece 18a is present between the two small blocks, it indicates that the clamp claws 11 are located at the positions at which they can clamp the stem S. When the detection piece 18a is absent between the two small blocks, it indicates that the clamp claws 11 are not located at the positions at which they can clamp the stem S. Typically, when the protrusion 14p of the actuator 14 fits into the fitting hole 13rf of the ring and the ring body 13r moves within the given range, the sensor 18b remains in a state of being detecting the detection piece 18a; when the protrusion 14p of the actuator 14 is out of the fitting hole 13rf, the sensor 18b is in a state of not being detecting the detection piece 18a. That is, when the sensor 18b does not detect the detection piece 18a, the operation of the actuator 14 does not cause the ring body 13r to rotate and therefore, it may be set that the actuator 14 is not allowed to operate. The cradle 18c provides a mount on which the sensor 18b is mounted. The cradle 18c is attached to a side surface of the pedestal 17B.

Subsequently, mainly referring to FIG. 3, the configuration of the welding apparatus 1 will be described. The welding apparatus 1 includes an upper electrode 20 and a power supply 50, in addition to the clamp unit 10 described heretofore. The following description of the welding apparatus 1 will be made using the configuration, often usually adopted, in which the upper electrode 20 is disposed vertically above the clamp unit 10. The direction in which the upper electrode 20 is disposed is called "upper," in some cases and the surface facing upward is called "top surface" in some cases. Here, the upper and lower directions on the drawing sheet of FIG. 3 correspond to the actual upper and lower directions. However, the arrangement of all the components is not limited to the exemplary arrangements described below. In another arrangement, for example, the upper electrode 20 and the clamp unit 10 may be horizontally arranged, unlike the case in which the upper electrode 20 is arranged vertically above the clamp unit 10. In the following description of the welding apparatus 1, when the description is made regarding the configuration of the clamp unit 10, FIGS. 1 and 2 will be referred to as appropriate. Since the configuration of the clamp unit 10 has already been described, configurations other than the clamp unit 10 will be described hereinafter.

The upper electrode 20 includes: a tip 21, body 23, chuck 26, and nut 29. The tip 21 is formed by cutting a frat columnar metal member so that the metal member is virtually divided into two in the thickness direction become smaller than that of the other portion. The tip 21 is formed with a through hole 21h at a portion through which the axis of the columnar metal member passes, with the hole having a size that allows the outer peripheral portion Cp of the cap C (see FIGS. 4A and 4B) to pass through it but does not allow the edge Ce to pass through it. The tip 21 has a recess formed on the back side of the small-sized portion (lower portion in FIG. 3), with the recess being capable of accommodating the chuck 26. The body 23 is an elongated columnar metal member having a diameter larger than the outer diameter of the tip 21. The body 23 has a projection portion at one end surface (lower end surface in FIG. 3) of the columnar metal member. Such a projection portion can fit into the recess of the tip 21 when the body 23 and the tip 21 are brought close to each other, with both the axis line of the body 23 and the axis line of the tip 21 being aligned together on the same virtual straight line. When the body 23 and the tip 21 are brought close to each other, the peripheral surface of the projection portion of the body 23 comes in contact with the surrounding surface of the recess of the tip 21. When the body 23 and the tip 21 are brought in contact with each other in this way, a clearance is formed between the projection portion of the body 23 and the recess of the tip 21, and the chuck 26 can be accommodated just in the clearance.

The chuck 26 is made of an elastic material such as rubber and is formed in a ring shape (annular shape). The chuck 26 has a hole that is formed to penetrate the central portion of the ring shape and to have the same size as the through hole 21h of the tip 21. The chuck 26 includes a fluid filling space to be filled with a fluid (typically air), with the space being formed inside of the ring shape body for surrounding the hole that penetrates the central portion. The chuck 26 is configured such that, when the fluid filling space is filled with the fluid while the outer peripheral portion Cp of the cap C has been inserted into the hole that penetrates the chuck's central portion, the fluid causes the chuck to expand toward the cap C, thereby holding the cap. In this way, the upper electrode 20 can hold the cap C with the chuck 26, so that it corresponds to a holder. The nut 29 is a part for maintaining the state in which the tip 21 is in contact with the body 23 with the chuck 26 being sandwiched between the body 23 and the tip 21. The nut 29 is configured to have a hole that allows the smaller-diameter portion of the tip 21 to pass through it but does not allow the larger-diameter portion to pass through it, and to have the outer diameter larger than that of the body 23. The nut 29 is formed with an internal thread on the periphery, and is formed so as to be screwed onto an external thread formed on the lower outer periphery of the body 23.

The power supply 50 applies a voltage between the lower electrode 17S of the clamp unit 10 and the upper electrode 20 to supply an electric current. Although the power supply 50 is illustrated as an alternating-current power supply, it may be a direct-current power supply. The power supply 50 is electrically connected to the lower electrode 17S and the upper electrode 20 via electric wires 59. The power supply 50 typically has a capacity of supplying a welding current capable of performing resistance welding (projection welding) at the portion (contact portion T [see FIG. 4A]) at which the base Sb of the stem S is in contact with the edge Ce of the cap C. The welding (joining) between the stem S and the cap C can be performed by using the lower electrode 17S, upper electrode 20, and power supply 50, which constitute a joining apparatus.

Next, with reference to FIG. 5, a method for manufacturing a joined object according to a third embodiment of the present invention will be described. FIG. 5 is a flowchart illustrating a procedure for manufacturing a device D serving as the joined object. The method for manufacturing the device D (manufacturing method of device D) to be described below is typically performed by the welding apparatus 1 including the clamp unit 10 described above. The following description of the manufacturing method of the device D will also serve as an explanation of the operation of the welding apparatus 1 (including the operation of the clamp unit 10). In the following description of the manufacturing method of the device D, when the description is made regarding the configuration of either the welding apparatus 1 including the clamp unit 10 or the structure of the device D, FIGS. 1 to 4B will be referred to as appropriate.

When manufacturing the device D, a stem pallet (not shown) in which a plurality of the stems S is arranged and a cap pallet (not shown) in which a plurality of the caps C is arranged, are carried into the welding apparatus 1. The placement position of the stem pallet (not shown) is a position away from the clamp unit 10 within the movement range of a stem transfer robot hand (not shown) that delivers the stems S to the clamp unit 10. On the other hand, the placement position of the cap pallet (not shown) is a position away from the upper electrode 20 within the moving range of a cap transfer robot hand (not shown) that delivers the caps C to the upper electrode 20. Note that, before the manufacture of the device D is started, all clamp claws 11 of the clamp unit 10 are in an open state.

When the stem pallet (not shown) and the cap pallet (not shown) are placed in predetermined positions in the welding apparatus 1, one of the stems S in the stem pallet (not shown) is placed on the lower electrode 17S of the clamp unit 10 through use of the stem transfer robot hand (not shown), and then the stem S is clamped by all the clamp claws 11 (clamping step: S1). This clamping step (S1) is performed in the detailed following manner: When the manufacture of the device D is started, the protrusion 14p of the actuator 14 is in the state of being fitted into the fitting hole 13rf of the swivel ring 13. At this time, the position of the bolt 13p in the elongated hole 11h of the clamp claw 11 is located not closest to the contact portion 11c side, but is located generally in the middle of the elongated hole 11h in the longitudinal direction. In this state, when the stem S is placed on the top surface of the lower electrode 17S by the stem transfer robot hand (not shown), the clearance between the stem S and the contact portion 11c is a first predetermined distance. The first predetermined distance is typically preferably set equal to the smallest possible distance within a range in which taking the stem S into and out the lower electrode 17S is not hindered. After the stem S has been placed on the top surface of the lower electrode 17S, the stem transfer robot hand (not shown) retracts toward the stem pallet (not shown). Then the controller (not shown) causes the actuator 14 to go into action. As a result, the ring body 13r moves clockwise along the surface 15f of the base 15. Then, as the ring body 13r moves, each of the bolts 13p moves in the elongated hole 11h of the corresponding clamp claw 11 toward the support hole 11s. This in turn causes all the clamp claws 11 to move in the direction in which the claws are closed, thereby clamping the stem S with all the clamp claws 11. At this time, each clamp claw 11 moves counterclockwise around the pin 16 in a virtual plane parallel to the surface 15f of the base 15 to clamp the side surface of the base Sb of the stem S, which allows the stem S to be clamped stably at the center position of the lower electrode 17S. Moreover, each clamp claw 11 is formed such that the contact portion 11c is made thinner than the surrounding principal part of the claw, allowing the base Sb with a relatively low profile to be clamped appropriately. In addition, the clamp claw 11 is formed such that the portion around the support hole 11s is made relatively thick, allowing a reduction in shake of the clamp claw 11 during pivot. Further, the stroke (corresponding to a predetermined stroke) of the swivel ring 13 that causes the clamp claw 11 to perform the opening or closing movement at this time, is relatively small because the maximum clearance between the stem S and the contact portion 11c is the first predetermined distance. This allows the time required for clamping the stem S to be relatively short, and also allows the required movement distance of the actuator 14 to be set small, resulting in a simple configuration of the actuator 14.

After the clamping step (S1) has been performed, one of the caps C in the cap pallet (not shown) is inserted into both the through hole 21h in the upper electrode 20 and the hole penetrating the central portion of the chuck 26, by use of the cap transfer robot hand (not shown). Then the fluid filling space of the chuck 26 is filled with the fluid to cause the chuck 26 to expand, thereby holding the cap C (holding step: S2). After the upper electrode 20 has held the cap C, the cap transfer robot hand (not shown) retracts toward the cap pallet (not shown). Note that although the holding step (S2) is performed after the clamping step (S1) in FIG. 5, the holding step (S2) may be performed before the clamping step (S1). In the case where the stem transfer robot hand (not shown) and the cap transfer robot hand (not shown) do not interfere with each other, the clamping step (S1) and the holding step (S2) may be preferably performed simultaneously, from the standpoint of time reduction.

After the clamping step (S1) and the holding step (S2) have been performed, the upper electrode 20 holding the cap C is confirmed to be located vertically above the stem S, and then the upper electrode is lowered, thereby bringing the edge Ce of the cap C into contact with the base Sb of the stem S (S3). After the edge Ce has been brought into contact with the base Sb, the upper electrode 10 is further pressed against the lower electrode 17S to apply a pressure on the contact portion T (projection) between the base Sb of the stem S and the edge Ce of the cap C. Then, under the applied pressure, the power supply 50 is turned on to supply a current across the contact portion T, thereby welding between the stem S and the cap C (joining step: S4). The welding is resistance welding of the contact portion T and is performed as follows: Upon turning on the power supply 50, a voltage is applied to cause a current from the power supply 50 to flow, via the electric wires 59, through the upper electrode 20, cap C, base Sb of the stem S, and lower electrode 17S in this order (or vice versa), thereby achieving the welding. At this time, in the present embodiment, the welding is performed in the state where the edge Ce of the cap C is in contact with the surface of the chip 21 over the entire circumference of the edge and the welding can be made uniformly over the entire circumference of the contact portion T. Performing the resistance welding of the contact portion T completes the manufacture of the device D. After the completion of the manufacture of the device D, the fluid is discharged from the fluid filling space of the chuck 26 to release unclamp the cap C. Then the upper electrode 20 is lifted. Then the controller (not shown) operates such that the actuator 14 is moved to move the swivel ring 13 counterclockwise. This causes all the clamp claws 11 to move in the opening direction to release (unclamp) the clamping of the stem S (here, having been turned into the device D on which the cap C has been attached) (S5). After the cap C and the stem S have been unclamped (S5), the device D is taken out from the lower electrode 17S by use of a robot hand (not shown) (S6). This completes the manufacture of one device D and, typically, the above-described flow is repeated to perform the continuous manufacture of the devices D.

When the manufacture of the device D is suspended and maintenance is performed, it is preferable to remove the protrusion 14p of the actuator 14 from the fitting hole 13rf of the swivel ring 13, and then turn the swivel ring 13 clockwise such that the bolt 13p comes to the position, closest to the contact portion 11c, of the elongated hole 11h of the clamp claw 11. The procedure causes the distances between all the contact portions 11c to be larger than the maximum distances during the manufacture of the device D (the state in which the maximum distances between the stem S and the contact portions 11c are the first predetermined distance). This allows easier approach to the lower electrode 17S and improvement in ease of the maintenance. In the case where each of the bolts 13p is located at the position closest to the contact portion 11c of the elongated hole 11h of the corresponding clamp claw 11, if it is assumed that the stem S is placed on the lower electrode 17S, the clearance between the contact portion 11c and the stem S corresponds to a second predetermined distance. The second predetermined distance may typically equal the distance required for maintenance. The length of the elongated hole 11h in the longitudinal direction is determined to be equal to the distance within which the clamp claw 11 can move from the position at which the clamp claw 11 can clamp the stem S, to the position at which the clamp claw is at the second predetermined distance from the stem S.

As described above, in accordance with the clamp unit 10 according to the present embodiment, the three clamp claws 11 each pivot around the respective pins 16 away from the respective contact portions 11c in one virtual plane that is parallel to the surface 15f of the base 15. This allows the stable clamping of the stem S at its central position even in the case where the outer diameter of the base Sb differs depending on the clamped stem S. Further, in manufacturing the devices D (in cases where the stems S are sequentially clamped), the pivot movement of each of the clamp claws 11 is preformed such that the maximum clearance between the stem S and the contact portion 11c becomes equal to the first predetermined distance, which allows shortening of the time required for opening and closing the clamp claws 11, leading to improved productivity. On the other hand, during maintenance, the clearance between the contact portion 11c and the stem S when assuming that the stem S is placed on the lower electrode 17S, can be widened equal to the second predetermined distance, resulting in improved workability of maintenance. Moreover, since the stopper 19 is disposed, it is possible to prevent an excessive external force from acting on the stem S, thereby avoiding damage to the stem S.

In the above description, the joined object is the device D of an optical semiconductor, and the object to be clamped is the stem S of the optical semiconductor. However, the joined object and the clamping object may be not necessarily the optical semiconductor and its component. For example, other objects and their components which are large and/or of different types, relative to those of the optical semiconductor may be used.

In the above description, when causing the clamp claws 11 to perform the opening or closing movement, the swivel ring 13 is moved with respect to the base 15 that is fixed. However, the swivel ring 13 may be fixed and the base 15 may be moved. Alternatively, both the swivel ring 13 and the base 15 may be moved (typically in the opposite directions of rotation). That is, they may be configured such that the swivel ring 13 moves relative to the base 15.

In the above description, the pin 16 for supporting the clamp claw 11 protrudes from the surface 15f of the base 15, and the ring body 13r to which the bolt 13p inserted into the elongated hole 11h is attached is rotated along the surface 15f by means of the actuator 14, thereby causing the clamp claw 11 to perform the opening or closing movement. Alternatively, a plurality of motors may be disposed for the respective clamp claws 11. Then each of the motor shafts is attached to the corresponding support hole 11s, and the motor shaft is rotated in both the forward and reverse directions, thereby causing the corresponding clamp claw 11 to perform the opening or closing movement. At this time, the motor serves as a mover apparatus and also serves as a support shaft, which allows omission of the swivel ring 13 and actuator 14 which serve as the mover apparatus as well as omission of the pin 16 which serves as the support shaft, thereby eliminating the need for the elongated hole 11h to be formed in the clamp claw 11. Alternatively, instead of using the motor shaft as the support shaft, a link device may be used to connect the motor shaft to the position, located away from the pin 16, of the clamp claw 11 supported by the pin 16. Then the motor shaft is rotated in one direction, thereby causing the clamp claw 11 to perform the opening or closing movement.

In the above description, when widening the distance between the contact portions 11c of each clamp claw 11 to a distance required for ease of maintenance of the clamp unit 10, the swivel ring 13 is manually moved. However, the swivel ring 13 may be automatically moved by controlling the movement distance of the actuator 14 provided that the allowable movement distance of the actuator 14 is set equal to a distance which enables the actuator to reach at least the position of the swivel ring 13 during maintenance.

In the above description, clamping mechanism, the joined object manufacturing apparatus and the method for manufacturing a joined object according to an embodiment of the present invention are described as one example referring to the drawings. However, the configurations, structures, numbers, arrangements, shapes, materials and so on of each part of the clamping mechanism, the joined object manufacturing apparatus and the method for manufacturing a joined object are not limited to the above specific examples, and those preferentially employed by those skilled in the art as appropriate are also embraced within the scope of the present invention as long as they cover the gist of the present invention.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

DESCRIPTION OF REFERENCE NUMERALS AND SYMBOLS 1 welding apparatus
10 clamp unit
11 clamp claw
11c contact portion
11h elongated hole
12 mover apparatus
13 swivel ring
13p bolt
14 actuator
15 base
15f surface
16 pin
17S lower electrode
19 stopper
20 upper electrode
50 power supply
C cap
S stem

The invention claimed is:

1. A clamping mechanism, comprising:
a plurality of clamp claws, each clamp claw including a contact portion configured to contact an object to be clamped, wherein the plurality of clamp claws clamps the object by contacting each contact portion with the object;
a plurality of support shafts, each support shaft pivotally supporting a corresponding clamp claw at a position away from the contact portion of the corresponding clamp claw, wherein the corresponding clamp claw pivots around the support shaft to cause the contact portion to approach and go away from the object for opening or closing movement of the corresponding clamp claw;
a mover apparatus configured to cause each clamp claw to perform the opening or closing movement; and
a base configured to support each support shaft such that each support shaft protrudes from a surface of the base,
wherein the mover apparatus comprises:
a swivel ring including rod-shaped members, each rod-shaped member inserted through an elongated hole, the elongated hole being formed between a support hole through which the support shaft passes and the contact portion of the clamp claw; and
an actuator configured to rotate the swivel ring, relative to the base, along the surface of the base,
wherein each rod-shaped member is configured to move relative to the elongated hole in a longitudinal direction of the elongated hole to cause the corresponding clamp claw to perform the opening or closing movement.

2. The clamping mechanism of claim 1, wherein
in a case in which the clamp claws sequentially clamp the object, the mover apparatus is configured to cause the clamp claws to perform the opening or closing movement such that a maximum clearance between the contact portion of each clamp claw and the object is a first predetermined distance; and
in a case in which the clamp claws do not clamp the object, the mover apparatus is configured to allow a clearance between the contact portion of each clamp claw and the object to be widened to be a second predetermined distance larger than the first predetermined distance.

3. The clamping mechanism of claim 1,
wherein the support shafts are disposed to be equal in number to the clamp claws. support shafts are disposed to be equal in number to the clamp claws.

4. The clamping mechanism of claim 1, wherein the mover apparatus is configured such that the actuator and the swivel ring are detachably connected to each other and such that, in a case in which the swivel ring is attached to the actuator, the actuator is configured to cause the swivel ring to rotate by a predetermined stroke; and
the predetermined stroke enables the mover apparatus to provide the clamp claws with sufficient opening or closing movement to clamp the object sequentially.

5. The clamping mechanism of claim 1, further comprising a stopper configured to directly and indirectly restrict the clamp claws from approaching each other more than a third predetermined distance.

6. A joined object manufacturing apparatus, comprising:
the clamping mechanism of claim 1;
a holder configured to hold an object to be joined to the object; and
a joining apparatus configured to join a portion where the object, clamped by the clamping mechanism, contacts the object to be joined that is held by the holder.

7. A method for manufacturing a joined object by use of the joined object manufacturing apparatus of claim 6, the joined object being manufactured by joining the object and the object to be joined, the method comprising:
causing the clamping mechanism to clamp the object;
causing the holder to hold the object to be joined; and
joining the object, clamped by the clamping mechanism, with the object to be joined that is held by the holder.

* * * * *